US009688426B2

(12) United States Patent
Chauvin et al.

(10) Patent No.: US 9,688,426 B2
(45) Date of Patent: *Jun. 27, 2017

(54) APPARATUS FOR BLOWING AND FILLING PLASTIC CONTAINERS

(75) Inventors: Guillaume Chauvin, Singapore (SG); Damien Kannengiesser, Golbey (FR)

(73) Assignee: DISCMA AG, Hunenberg (CH)

( * ) Notice: Subject to any disclaimer, the term of this patent is extended or adjusted under 35 U.S.C. 154(b) by 571 days.

This patent is subject to a terminal disclaimer.

(21) Appl. No.: 14/236,821

(22) PCT Filed: Aug. 2, 2012

(86) PCT No.: PCT/EP2012/065116
§ 371 (c)(1),
(2), (4) Date: Feb. 3, 2014

(87) PCT Pub. No.: WO2013/020884
PCT Pub. Date: Feb. 14, 2013

(65) Prior Publication Data
US 2014/0174044 A1    Jun. 26, 2014

(30) Foreign Application Priority Data
Aug. 8, 2011    (EP) .................................... 11176852

(51) Int. Cl.
*B67B 3/00*    (2006.01)
*B67B 3/10*    (2006.01)
(Continued)

(52) U.S. Cl.
CPC ............... *B65B 3/02* (2013.01); *B29C 49/46* (2013.01); *B65B 3/022* (2013.01); *B65B 7/2835* (2013.01);
(Continued)

(58) Field of Classification Search
CPC .......... B65B 3/02; B65B 3/022; B65B 7/2835; B67B 3/2066; B67B 2201/06; B67B 3/10;
(Continued)

(56) References Cited

U.S. PATENT DOCUMENTS 3,162,706 A * 12/1964 Cheney ................. B29C 49/022
264/525
3,196,592 A *  7/1965 Cheney ................... B29C 47/20
425/117
(Continued)

FOREIGN PATENT DOCUMENTS

DE    WO 2011076167 A1 *  6/2011 ............. B29C 49/12
WO       2011/076167 A1     6/2011

OTHER PUBLICATIONS

English Machine Translation of WO 2011076167 A1.*

*Primary Examiner* — Andrew M Tecco
*Assistant Examiner* — Praachi M Pathak
(74) *Attorney, Agent, or Firm* — Eric J. Sosenko; Jonathan P. O'Brien; Honigman Miller Schwartz and Cohn LLP

(57) ABSTRACT

The invention concerns an apparatus (10) for simultaneously blowing and filling a plastic container from a preform, the apparatus comprising: a mold (14) for enclosing a preform, so as to leave access to the mouth of the preform, stretching means (42) for stretching the preform within the mold, an injection head (16) for injecting a liquid through the mouth so as to cause expansion of the preform within the mold, thereby obtaining a blown and filled container (12) that comprises a dispensing opening (22), characterized in that the apparatus further comprises a capping head (18) for fixing a cap (40) on the dispensing opening of said blown and filled container, the capping head being permanently arranged between the injection head (16) and the mold (14).

17 Claims, 4 Drawing Sheets

(51) Int. Cl.
*B65B 3/02* (2006.01)
*B29C 49/06* (2006.01)
*B29C 49/12* (2006.01)
*B65B 7/28* (2006.01)
*B29C 49/46* (2006.01)

(52) U.S. Cl.
CPC .............. *B29C 49/06* (2013.01); *B29C 49/12* (2013.01); *B29C 2049/4664* (2013.01)

(58) Field of Classification Search
CPC ........ B67C 2003/227; B29C 2049/465; B29C 2049/4655; B29C 2049/4664; B29C 49/46; B29C 49/4273; B29C 49/12
USPC ...... 53/558, 559, 561, 574, 578, 317, 331.5, 53/471; 425/524
See application file for complete search history.

(56) References Cited

U.S. PATENT DOCUMENTS

| | | | | |
|---|---|---|---|---|
| 3,251,915 A | * | 5/1966 | Pechthold | B29C 49/04 264/524 |
| 3,785,116 A | * | 1/1974 | Munz | B65B 3/022 425/524 |
| 4,539,172 A | * | 9/1985 | Winchell | B29C 49/04 264/515 |
| 5,293,809 A | * | 3/1994 | Van Der Heijden | B23Q 5/26 901/29 |
| 5,350,483 A | * | 9/1994 | Yager | B29C 49/78 156/245 |
| 5,362,222 A | * | 11/1994 | Faig | B29C 45/7666 264/40.3 |
| 5,400,564 A | * | 3/1995 | Humphries | B65B 7/2835 53/308 |
| 7,862,327 B2 | * | 1/2011 | Rousseau | B29C 49/58 425/529 |
| 7,914,726 B2 | * | 3/2011 | Andison | B29C 49/46 264/523 |
| 8,458,992 B2 | * | 6/2013 | Zanini | B67B 3/2033 53/317 |
| 9,079,676 B2 | * | 7/2015 | Feuilloley | B29C 49/46 |
| 9,254,617 B2 | * | 2/2016 | Maki | B29D 22/003 |
| 2001/0010145 A1 | * | 8/2001 | Tawa | B65B 3/022 53/425 |
| 2006/0242929 A1 | * | 11/2006 | Servadei | B67B 3/261 53/490 |
| 2010/0213629 A1 | * | 8/2010 | Adriansens | B29C 49/78 264/40.5 |
| 2012/0174536 A1 | * | 7/2012 | Schwarz | B67B 3/264 53/476 |
| 2012/0266567 A1 | * | 10/2012 | Haesendonckx | B65B 3/022 53/456 |
| 2014/0174044 A1 | * | 6/2014 | Chauvin | B65B 3/022 53/574 |
| 2015/0021833 A1 | * | 1/2015 | Chauvin | B29C 49/12 264/524 |
| 2015/0284115 A1 | * | 10/2015 | Voth | B65B 31/022 53/453 |
| 2016/0059469 A1 | * | 3/2016 | Diesnis | B65B 3/022 215/40 |
| 2016/0271858 A1 | * | 9/2016 | Diesnis | B65B 3/022 |

\* cited by examiner

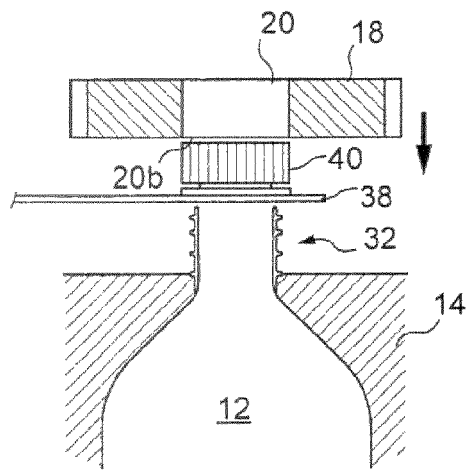
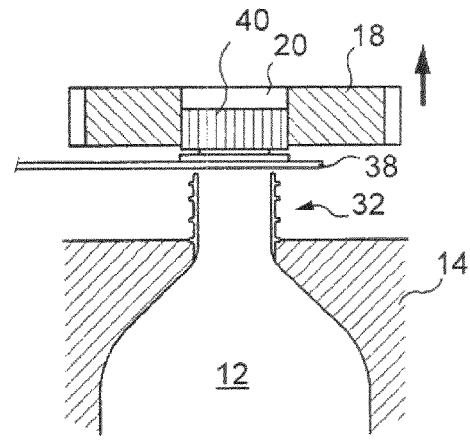
Fig. 3A  Fig. 3B
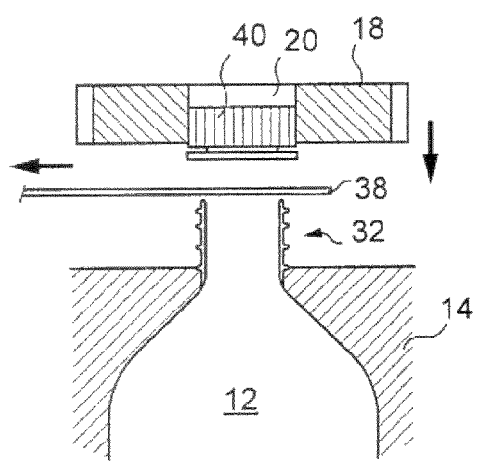
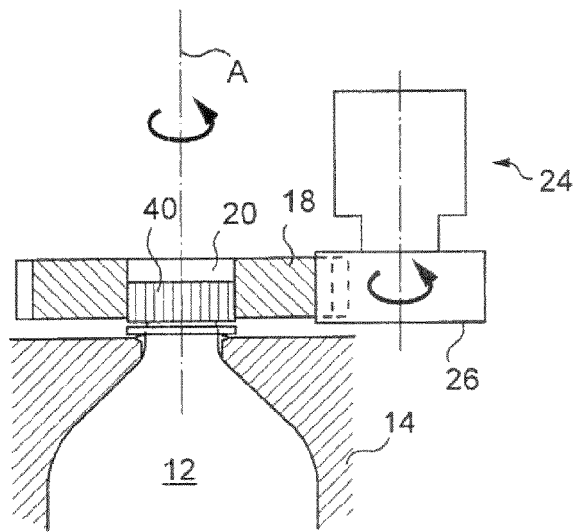
Fig. 3C  Fig. 3D

APPARATUS FOR BLOWING AND FILLING PLASTIC CONTAINERS

CROSS REFERENCE TO RELATED APPLICATIONS

The present application is a National Stage of International Application No. PCT/EP2012/065116, filed on Aug. 2, 2012, which claims priority to European Patent Application No. 11176852.9, filed Aug. 8, 2011, the entire contents of which are being incorporated herein by reference.

FIELD OF THE INVENTION

The invention relates to an apparatus for blowing and filling plastic containers from preforms.

BACKGROUND

Plastic containers such as bottles of water are manufactured and filled according to different methods including blow moulding or stretch-blow moulding.

According to one of these known methods a plastic preform is first manufactured through an injection molding process and then heated before being positioned inside a mould.

The preform usually takes the form of a cylindrical tube of sod at its bottom end and open at its opposite end.

Once the preform has been positioned within the mould only the open end of the preform is visible from above the mould.

This method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated a liquid is also injected into the preform through its open end. This liquid injection causes expansion of the preform until coming into contact with the inner was of the mould, thereby achieving the final shape of the bottle.

The bottle which has been thus manufactured and filled within the mould has then to be sealed with a cap.

In this respect, the mould is opened and the bottle filled with liquid is transferred to a station provided with a capping head.

A cap is placed within the capping head and the latter is rotated around the threaded neck of the bottle so as to screw the cap around the neck.

Although this method proves to be satisfactory, there is nevertheless a need to make the blowing, filling and capping process easier.

SUMMARY OF THE INVENTION

In this respect, the invention provides an apparatus as defined in claim 1.

In the apparatus according to the invention the capping head is located between the injection head and the mould during the blowing and filling of the container (through stretching and expansion operations). Thus, once the container has been blown and filled there is no need to raise the injection head and bring a capping head between the latter and the mould which still encloses the container since the capping head is already in place, at the appropriate location.

There is no need either to transfer the filled and opened container towards a distant station equipped with a capping head, thereby avoiding, or at least reducing, splashing of the liquid when being moved.

Thus, the blowing, filling and capping process gets simplified and faster than in the prior art.

According to one feature, the capping head has a traversing hole that is centered about an axis of alignment along which the injection head and the mould are aligned, said traversing hole enabling injection of the liquid into the opening of the container from the injection head.

Thus, the traversing hole of the capping head is arranged between the injection head and the mould and, more particularly, is facing both the cutlet of the injection head through which liquid exits and the dispensing opening of the container.

It is to be noted that the axis of alignment also passes by the dispensing opening of the container, in the middle thereof.

According to one possible feature, the capping head is mounted on the injection head.

This provides a simple arrangement of the capping head between the injection head and the mould.

More particularly, the capping head is mounted under the injection head.

According to a more specific feature, the capping head is rotatably mounted relative to the injection head.

This mounting is particularly convenient for a subsequent step during which a cap will be screwed around the neck of the dispensing opening.

However, other kind of capping operations may be envisaged which do not require a rotating capping head.

Thus, other capping techniques may be envisaged such as screw capping, press on capping, sealing capping (with aluminum foil), and ultrasonic sealing capping.

According to another possible feature, the apparatus comprises driving means for driving the capping head in rotation around an axis of rotation that coincides with the axis of alignment of the injection head and the mould.

Thus, the apparatus comprises appropriate means for driving a capping head in rotation with a view to fixing a cap on the dispensing opening of the container.

Such driving means can be permanently integrated in the apparatus, which, therefore, does not necessitate bringing them close to the capping head when needed.

More particularly, said driving means may be laterally offset relative to the axis of rotation.

This arrangement makes it possible to accommodate said driving means in the apparatus in a permanent manner (the driving means are located in a position which does not hinder the longitudinal movement of the injection head), while the capping head is permanently disposed between the injection head and the mould.

Thus, the laterally offset driving means enable driving in rotation of the capping head for capping purpose without changing the position of the capping head and the driving means after the container has been blown and filled.

According to one possible feature, said driving means are coupled to the periphery of the capping head, e.g. through a mesh engagement.

According to another possible feature, said driving means are activated while the container is maintained within the mould in a fixed position.

This feature is advantageous in that the mould enclosing the blown and filled container remains at the same location as that occupied during the blowing and filling process and still keeps the container in place.

Splashing of the liquid in the container is therefore avoided.

According to another possible feature, said driving means comprise a brushless motor.

These kinds of driving means enable accurate control of the screwing torque during the screwing operation of a cap around the threaded neck of the dispensing opening.

Alternatively, another kind of motor may be envisaged together with a magnet coupling.

It is to be noted that the mould maintaining the container in position during the capping operation is used as an anti-rotating means.

According to another possible feature, the capping head has receiving means for receiving a cap to be fixed on the opening of the container and holding means for holding said cap within said receiving means.

According to another possible feature, said receiving means comprise the traversing hole.

Thus, the cap is received within the traversing hole and may be tightly fitted therein thanks to appropriate sizing of the internal dimensions of the traversing hole and external dimensions of the cap.

According to a possible feature, said holding means are arranged around the traversing hole.

Such holding means may be, e.g. the internal walls of the traversing hole and/or elastic means provided therein.

According to another possible feature, said stretching means comprise a stretch rod.

In a conventional manner, such stretching means are used during the fling phase for stretching the preform within the mould.

According to another possible feature, the apparatus comprises actuation means for causing the stretch rod to move downwardly towards the receiving means in which a cap may be blocked.

The stretch rod has a dual purpose since it both participates in stretching the preform within the mould during the blowing and filling process and releasing a cap which has been blocked within the receiving means of the capping head.

According to another possible feature, the injection head is mobile in a translational movement. This movement is performed along the longitudinal axis of alignment of the injection head and the mould.

According to another possible feature, the injection head and the capping head are mobile together in a translational movement so as to bring the capping head against the mould or move it away therefrom.

Such a translational movement makes it possible for the capping head to come into contact with the mould around the dispensing opening of the container. For instance, this may occur during the blowing and filling process. Such a movement makes it possible for the capping head to move away from the mould, e.g. when a cap has to be provided to the capping head.

According to another possible feature, the apparatus comprises:
bringing means for bringing a cap to be fixed on the opening of the container between the capping head and the mould after the capping head has been moved away from the mould, and
positioning means for positioning said cap within the receiving means of the capping head.

Thus, when the capping head has been moved away from the mould, an appropriate space has been left between the capping head and the dispensing opening of the container which protrudes from the mould. This space is used for disposing therein said movable bringing and positioning means.

BRIEF DESCRIPTION OF DRAWINGS

Embodiments of the present invention will now be described, by way of example only, with reference to the accompanying figures in which:

FIGS. 3A-D are successive schematic views illustrating the different operations for bringing and positioning a cap on the capping head and fixing it on the dispensing opening of the container:

DESCRIPTION OF THE PREFERRED EMBODIMENT

Figure 1:
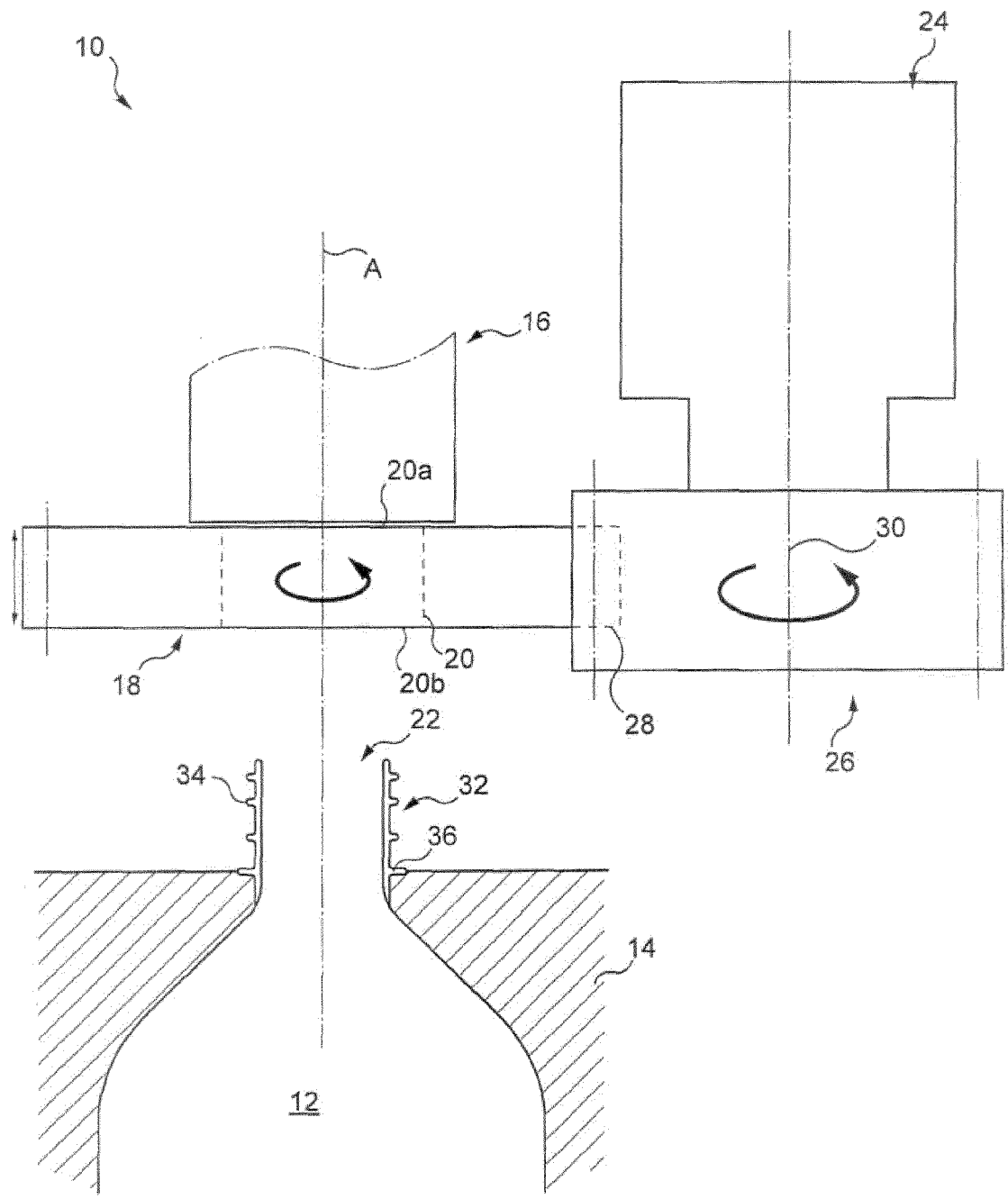
FIG. 1 is a schematic and overall view of an apparatus according to the invention with its main components.

FIG. 1 illustrates a schematic and partial view of the main components of an apparatus 10 for simultaneously blowing and filling a plastic container from a preform.

As represented in FIG. 1, the container is a bottle 12 which has been filled with a liquid.

Apparatus 10 comprises a mould 14 enclosing bottle 12 in the position of FIG. 1.

Also, apparatus 10 comprises an injection head 16 through which the liquid has been injected into the bottle during its shaping.

Apparatus 10 also comprises stretching means which, here, comprise a stretch rod represented in FIGS. 4A and 4B and which will be described subsequently.

Apparatus 10 further comprises a capping head 18 that is rotatably mounted relative to injection head 16.

As represented in dotted lines, capping head 18 has a traversing hole 20 that is centered about a longitudinal axis A.

Axis A is an axis of alignment along which injection head 16 and mould 14 are aligned in the manufacturing configuration of FIG. 1.

Traversing hole 20 has two opposite sides 20a and 20b. Side 20a faces injection head 16 while opposite side 20b faces mould 14 and, more particularly, the dispensing opening 22 of container 12.

Although not represented in the drawings, injection head 16 has an outlet through which liquid flows before entering into traversing hole 20 and dispensing opening 22 when capping head 18 rests against mould 14 and traversing hole 20 surrounds dispensing opening 22.

This position is not illustrated in the drawings and represents the position in which the container is simultaneously blown and filled.

Furthermore, apparatus 10 comprises driving means 24 for driving capping head 18 in rotation around an axis of rotation that coincides with longitudinal axis of alignment.

As represented in FIG. 1, driving means 24 are laterally offset relative to axis A and are coupled to the periphery of capping head 18.

More particularly, driving means comprise a gear 26 which cooperates with a gear 28 provided at the periphery of capping head 18.

These gears may be in a mesh engagement and for instance, may be toothed gears.

Gear 26 is for instance mounted on the output shaft 30 of a motor 24.

Motor 24 is for example a brushless motor.

This motor makes it possible to accurately control the force transmitted to capping head 18 and therefore to the cap during the screwing process that will be described subsequently.

FIG. 1 shows a manufactured container 12 after it has been simultaneously blown and filled with a liquid through a conventional process such as described in the Applicant's patent application EP 1 529 620.

Briefly, container 12 has been produced from a plastic preform.

According to this known process, the plastic preform is first manufactured through a moulding process and then heated before being positioned within mould 12 so as to leave access to the mouth of the preform.

Thus, the mouth of the preform protrudes from the upper part of the mould which encloses the rest of the preform.

Mould 14 may be spited into two or more parts depending on the manufacturing process.

The preform usually assumes the shape of a cylindrical tube closed at its bottom end and open at its opposite end.

Once the preform has been positioned within the mould, only the open end of preform with its protruded mouth is visible from above the mould.

The open end is shaped during the process, thereby leading to dispensing opening 22.

The blowing and filling process makes use of a stretch rod (represented in FIGS. 4A and 4B) which is downwardly engaged into the open end of the preform so as to come into contact with the closed bottom end thereof.

The stretch rod is then further actuated to push the closed end downwardly and stretch the preform accordingly in a controlled manner.

After the stretching phase has been initiated, the liquid supplied by the injection head 16 is injected into the preform through its open end around the stretch rod, while the latter is still being actuated.

This liquid injection causes expansion of the preform together with the movement of the stretch rod until coming into contact with the inner walls of the mould.

The final shape of the container 22 is thus achieved.

Once the container has been blown and filled according to the above-described process, a cap has to be fixed to the dispensing opening 22 of the container.

In this respect, injection head 16 and capping head 18 which are mobile together in a translational movement along axis A are caused to be raised along axis A so as to leave free sufficient space between capping head 18 and dispensing opening 22.

It is to be noted that the connection between injection head 16 and capping head 18 is a rotatable connection comprising needle bearings.

Such a rotatable connection is known to the skilled person.

It is to be noted that dispensing opening 22 has a neck 32 with an outside thread 34 and a flange 36 that is provided at the basis of the neck. Flange 36 is positioned within a recess provided in the upper part of mould 14.

Figure 2:
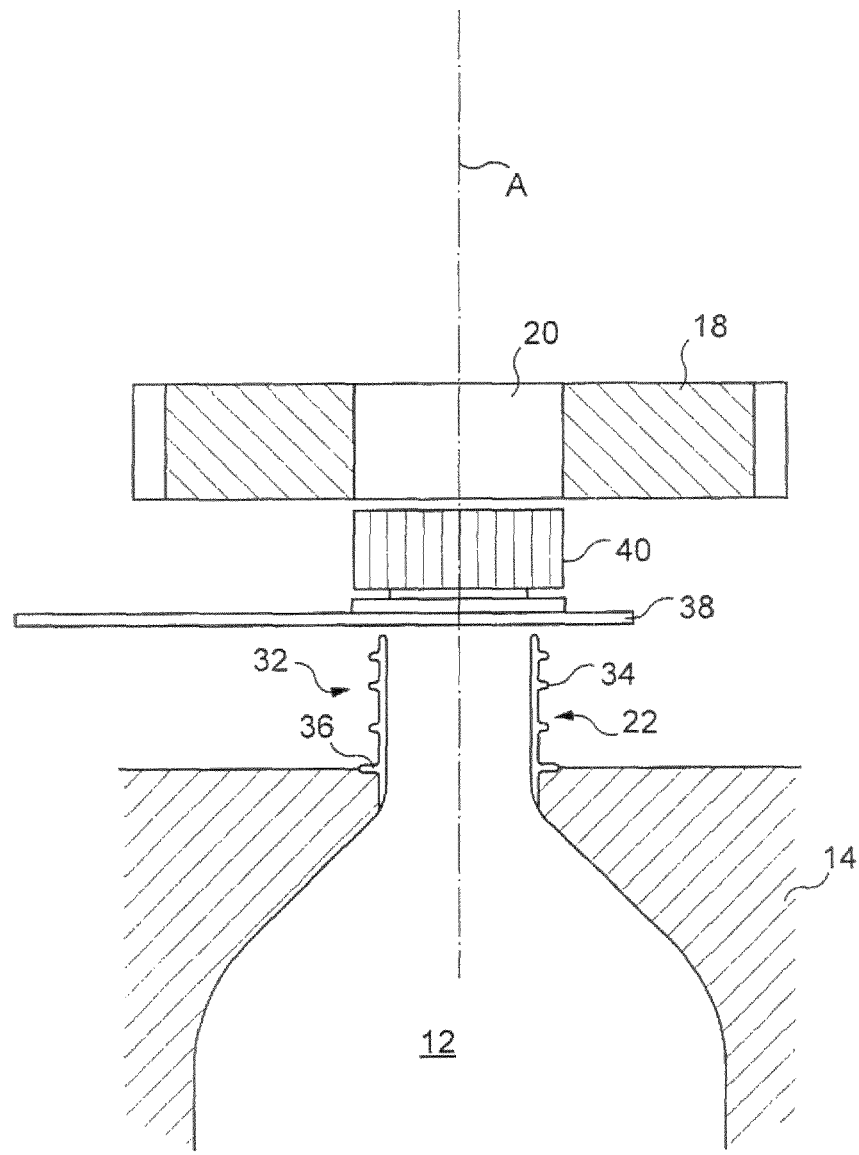
FIG. 2 is a schematic and partial view of the apparatus of FIG. 1 with means for bringing and positioning a cap on the capping head.

FIG. 2 is a schematic and simplified view representing container 12 maintained within mould 14 and capping head 18 away from mould 14 and neck 32.

Apparatus 10 comprises bringing means 38 for bringing a cap 40 to be fixed on dispensing opening 22. Bringing means 38 have been moved from a rest position (not represented) to an active position located between capping head 18 and dispensing opening 22.

Bringing means 38 may assume the shape of a cap distributing plate provided, for instance, with a slight recess on the upper surface thereof for positioning and maintaining in a fixed position cap 40 on the plate.

This plate may be a rotating plate comprising several caps at its periphery or an elongated plate which carries only one cap at one end and is elongated along an axis that is perpendicular to axis A.

FIGS. 3A to 3D illustrate successive views showing the capping process of the container.

FIG. 3A is identical to FIG. 2 where cap 40 has been brought between capping head 18 and neck 32 and positioned below traversing hole 20 vis-à-vis side 20b thereof. Injection head 16 and attached capping head 18 are actuated to be lowered towards bringing means 38 and cap 40.

As represented in FIG. 3B, capping head 18 is moved downwardly towards neck 32 and cap 40 is forcibly engaged within traversing hole 28 as capping head 18 is actuated downwardly.

The inner dimensions of the traversing hole 20 (inner diameter) and the outer dimensions of cap 40 (outside diameter) are adjusted so that cap 40 can be introduced in force within traversing hole 20 and remain in place as represented in FIG. 3C.

It is to be noted that cap 40 is partly engaged within hole 20.

Cap 40 is kept in position within receiving means of capping head (inner whole of traversing hole 20) thanks to friction forces. Cap 40 is tight fitted within filled said receiving means.

The degree of introduction of cap 40 into traversing hole 20 depends on the respective dimensions of the cap and the hole. The more the respective dimensions correspond to each other, the less cap 40 is introduced into traversing hole 20.

In the present embodiment, cap 40 has been positioned within the receiving means of the capping head 18 only by virtue of the translational movement of the injection head and capping head.

This is a very convenient means for putting in place the cap within the capping head which does not require any other device. Moreover, bringing means 38 may be simplified since they do not need to be movable along vertical axis A.

However, other positioning means may be envisaged for positioning the cap within the receiving means of capping head 18.

Other bringing means for bringing cap 40 between capping head 18 and the dispensing opening of the container may be alternatively envisaged.

Reverting to FIG. 3C, once cap 40 has been appropriately positioned within traversing hole 20 bringing means 38 are withdrawn as indicated by the arrow.

Next, capping head 18 equipped with cap 40 is driven into a downwardly translational movement along axis A thanks to the accordingly actuated injection head 16 so as to place cap 40 around neck 32.

As represented in FIG. 3D, driving means 24 are activated in order to drive into rotation capping head 18 such as already described above.

Capping head is therefore driven into rotation around axis A. This rotational movement of capping head 18 causes cap 40 to be driven into rotation around neck 32, thereby tightly screwing cap 40 around the neck of the container.

Other capping techniques may be alternatively envisaged for capping container 12. For instance, press-on cap type or ultrasonic sealing techniques may be used. In case of ultrasonic sealing, the neck and the cap may be made together using over-moulding techniques.

It will be appreciated that the apparatus which has been described is of a particularly simple construction and has movable parts or components which are capable of moving only according to fewer and simple movements (translation and rotation).

Also, the capping head is either driven into a translational movement along longitudinal axis A (for example vertical axis) during the blowing, filling and capping process or driven into rotation during the last step of the capping process (FIG. 3D).

Figure 4A:
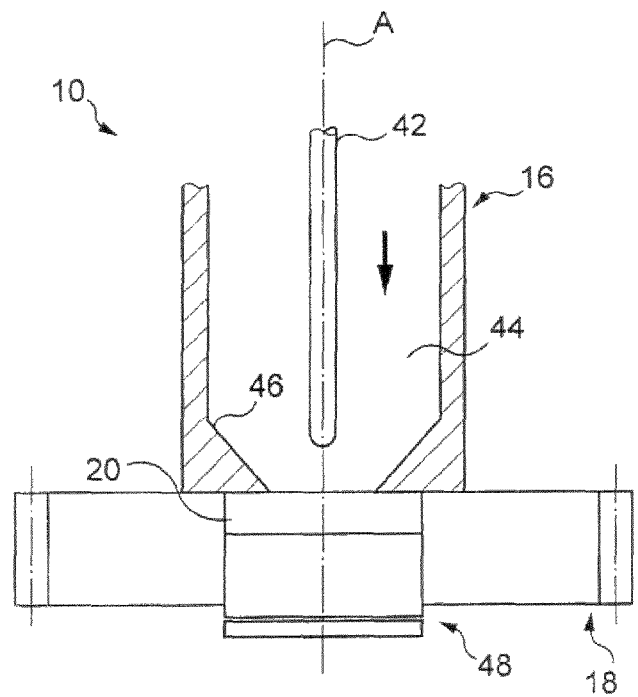
FIGS. 4A and 4B are two successive views showing the use of a stretch rod to disengage a cap trapped inside the capping head.
Figure 4B:
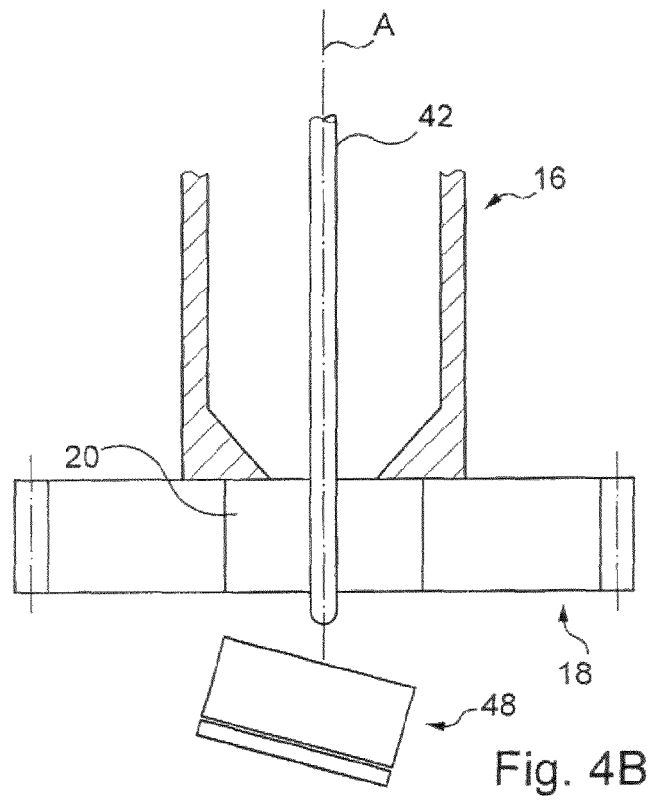

FIGS. 4A and 4B represent injection head 16 and capping head 18 only. Mould 14 and closing container 12 are still located under the capping head but have been removed for clarity purpose.

As represented in FIG. 4A, apparatus 10 comprises a stretch rod 42 which is in a sliding connection within injection head 16.

Stretch rod 42 is actuated by conventional actuating means not represented in the drawings and which cause it to move upward and downward along longitudinal axis A.

Injection head 16 comprises an inner housing 44 which is substantially cylindrical in shape and accommodates therein stretch rod 42 as well as an injection nozzle not represented in the drawings for the sake of clarity.

The injection nozzle rests against the frusto-conical inner surface 46 of the inner housing 44 to achieve fluidtight sealing when injection of fluid into the container is no longer necessary.

This injection nozzle stays in this resting position during the capping process which has been described above.

The injection nozzle is perforated in its middle portion so as to receive stretch rod 42 therein.

In FIG. 4A, a cap 48 is held within the receiving means (traversing hole 20 of injection head 18).

However, cap 48 is incorrectly positioned within injection head 18.

For instance, cap 48 has been introduced within traversing hole 20 over a too great distance which has led to blocking the cap.

Alternatively, the cap may have been introduced within hole 20 in a slanted manner, thereby leading to blocking it inside the hole.

This blocking situation may be detected when positioning a cap within the injection head (FIG. 3B) or when fixing the cap on the dispensing opening of the container (FIG. 3D), for instance after screwing it and trying to move the injection head away from the FIG. 3D position.

This situation has been addressed as illustrated in FIGS. 4A and 4B using stretch rod 42.

As represented in FIG. 4B, when cap 48 has been detected as being blocked stretch rod 42 is caused to move downwardly towards injection head 18 and more particularly, receiving means 20.

Stretch rod 42 then exerts a vertical force on cap 48 and pushes it downwardly out of receiving means 20 as illustrated in FIG. 4B, thereby freeing said receiving means and removing the blocked cap.

The invention claimed is:

1. Apparatus for simultaneously blowing and filling a plastic container from a preform, the apparatus comprising:
    a mold configured to enclose a preform, so as to leave access to a mouth of the preform,
    a stretching member configured to stretch the preform and being movable to position within the mold,
    an injection head having an outlet and configured to inject a liquid from the outlet through the capping head and the mouth of the preform so as to cause expansion of the preform within the mold, thereby obtaining a blown and filled container that comprises a dispensing opening, the stretching member being received within the injection head and axially movable relative thereto, and
    a capping head configured to affix a cap on the dispensing opening of said blown and filled container, the capping head being permanently arranged between the injection head and the mold such that liquid is injected from the outlet into the capping head and into the mouth of the preform during blowing and filling.

2. The apparatus of claim 1, wherein the capping head includes portions defining a traversing hole extending through the capping head that is centered about an axis of alignment along which the injection head and the mold are aligned, the capping head configured to inject the liquid into the traversing hole and into the opening of the container from the injection head.

3. The apparatus of claim 2, comprising a driver coupled to the capping head and configured to rotate the capping head around an axis of rotation that coincides with the axis of alignment of the injection head and the mold.

4. The apparatus of claim 3, wherein the driver is laterally offset relative to the axis of rotation.

5. The apparatus of claim 3, wherein the driver is coupled to an outer periphery of the capping head.

6. The apparatus of claim 3, wherein the driver is activated while the container is maintained within the mold.

7. The apparatus of claim 3, wherein the driver comprises a brushless motor.

8. The apparatus of claim 2, wherein a receiving member comprises the traversing hole.

9. The apparatus of claim 8, wherein a holder is arranged around the traversing hole.

10. The apparatus of claim 1, wherein the capping head is rotatably mounted relative to the injection head.

11. The apparatus of claim 1, wherein the capping head has a receiving member configured to receive a cap to be fixed on the opening of the container and a holder configured to hold the cap within the receiving member.

12. The apparatus of claim 11 comprising:
    a bringing member configured to position a cap to be fixed on the opening of the container between the capping head and the mold after the capping head has been moved away from the mold, and
    positioning member configured to position the cap within the receiving member of the capping head.

13. The apparatus of claim 1, wherein the stretching member comprising a stretch rod.

14. The apparatus of claim 1 comprising an actuator configured to move the stretch rod downwardly towards a receiving member in which a cap may be blocked.

15. The apparatus of claim 1, wherein the injection head is mobile in a translational movement.

16. The apparatus of claim 15, wherein the injection head and the capping head are mobile together in a translational movement so as to bring the capping head against the mold or move it away therefrom.

17. The apparatus of claim 15, wherein the translational movement is a vertical movement that takes place above the mold.

* * * * *